United States Patent [19]

Kim

[11] Patent Number: 5,423,487
[45] Date of Patent: Jun. 13, 1995

[54] ASSEMBLY OF NOZZLE JOINT WITH NOZZLE CASE FOR HEADLAMP WASHING SPRAY NOZZLE

[75] Inventor: Choong Y. Kim, Kyungsangnam-do, Rep. of Korea

[73] Assignee: Hyundai Motor Co., Ltd., Seoul, Rep. of Korea

[21] Appl. No.: 131,516

[22] Filed: Oct. 4, 1993

[30] Foreign Application Priority Data

Oct. 7, 1992 [KR] Rep. of Korea ................ 1992- 9217

[51] Int. Cl.6 .................... B05B 1/10; B05B 15/06
[52] U.S. Cl. .................. 239/284.2; 239/600; 293/117
[58] Field of Search ............. 239/284.1, 284.2, 289, 239/600; 293/117; 285/46, 62, 212, 219

[56] References Cited

U.S. PATENT DOCUMENTS

| | | | |
|---|---|---|---|
| 2,289,650 | 7/1942 | Horton | 239/284.1 |
| 4,026,473 | 5/1977 | Tinder et al. | 239/284.2 X |
| 4,811,903 | 3/1989 | Okuma et al. | 239/284.2 |

FOREIGN PATENT DOCUMENTS

| | | | |
|---|---|---|---|
| 63372 | 9/1955 | France | 239/284.1 |
| 2271080 | 12/1975 | France | 239/284.1 |
| 2276198 | 1/1976 | France | 293/117 |
| 2425148 | 12/1975 | Germany | 293/117 |
| 1441952 | 7/1976 | United Kingdom | 239/284.2 |

*Primary Examiner*—William Grant
*Attorney, Agent, or Firm*—Kenyon & Kenyon

[57] ABSTRACT

The present invention relates to an assembly of a nozzle joint with a nozzle case for equipping a headlamp washing spray nozzle on an automobile, wherein the nozzle joint is directly secured to the nozzle case by a screw, which also acts to secure the assembly on the bumper cover, to thereby improve the function and ease of assembling.

4 Claims, 2 Drawing Sheets

(PRIOR ART)

ASSEMBLY OF NOZZLE JOINT WITH NOZZLE CASE FOR HEADLAMP WASHING SPRAY NOZZLE

BACKGROUND OF THE INVENTION

The present invention relates to an assembly of a nozzle joint with a nozzle case for equipping a headlamp washing spray nozzle on an automobile.

A headlamp washing spray nozzle, which is recently equipped for functional variety and high-grade articles of automobiles, is assembled on a bumper cover in front of a headlamp as the form of assembling a nozzle joint with a nozzle case in a single body.

As shown in FIG. 1, the prior art assembly of nozzle joint 1 with nozzle case 2 is assembled by forming an incision opening part 4 of which a protecting plate 5 is adhered to the circumference, and assembling a supporting plate 6, formed in a single body with said nozzle joint 1, by screw 7 in the upper of said protecting plate 5 to place said nozzle joint 1 between the inside and outside of said incision opening part 4. Thus, said nozzle case 2 is compressed on the upper of said nozzle joint 1. The reference number 8 is a nut.

However, this prior art assembly of a nozzle joint with a nozzle case has the faults that screw-assembling is difficult and the press-inserting property of the nozzle case and exterior view are inferior.

The object of the present invention is to provide an assembly of a nozzle joint with a nozzle case for a headlamp washing spray nozzle, which nozzle joint and nozzle case are directly assembled with the bumper cover, as well as each other, by means of a screw to strongly secure.

SUMMARY OF THE INVENTION

Figure 1:
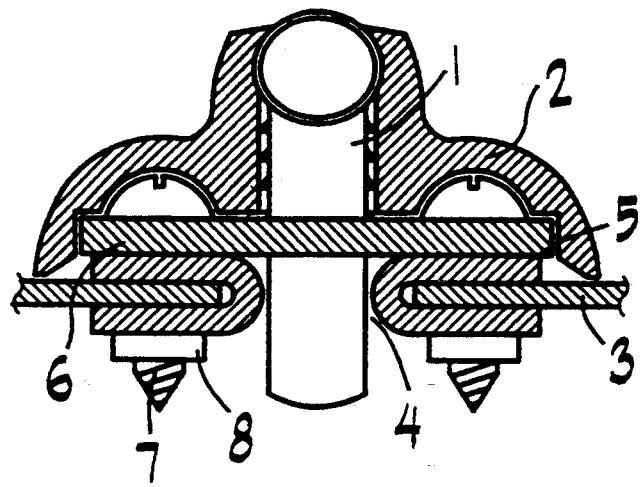
FIG. 1 shows a cross sectional view of a prior art assembly of a nozzle joint with a nozzle case.

The present invention relates to an assembly of a nozzle joint 10 with a nozzle case 11 comprising:
- a nozzle joint 10 having a nozzle tube 20 comprised of a head 18 and a body 19, and a combining means 25 comprised of a compression flange 21, compressing fragment 22, screw passing space 23, compressing protuberance 31 and body supporting plate 24;
- nozzle case 11 having a hemisphere-typed cover 28 wherein opened hole 26 is provided on one side and a screw assembling rod 27 is provided on the inner side of the cover; and
- bumper cover 12 having incision opening part 13.

DETAILED DESCRIPTION OF THE INVENTION

According to the present invention, the nozzle joint 10 is assembled with the nozzle case 11, on the bumper cover 12 having incision opening part 13, by screwing the screw passing space 23 of nozzle joint 10 and the screw assembling rod 27 of nozzle case 11 with a screw 16, wherein the lower section 29 of nozzle case 11 and the compressing protuberance 31 on the body supporting plate 24 of nozzle joint 10 are compressed with the bumper cover 12 between them.

Figure 2:
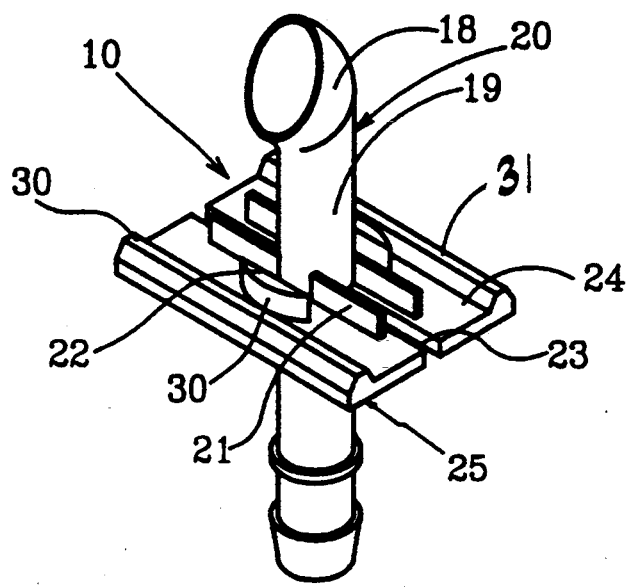
FIG. 2 shows a perspective view of the nozzle joint according to the present invention.

A perspective view of the nozzle joint 10 of the present invention is shown in FIG. 2. As shown in FIG. 2, the nozzle tube 20 includes head 18 and body 19 of tubular shape such that head 18 is curved in the front. Thus, the head 18 of nozzle tube 20 has an opening hole for injecting cleaning water. The combining means 25 is horizontally placed at the middle position of body 19 and comprises the following parts: the body supporting plate 24 having the screw passing space 23 in the center and the compressing protuberance 31 on both edges; the compression flange 21 providing structural stiffness between the body supporting plate 24 and the body 19, wherein the body 19 is tube-shaped on the upper side of the body supporting plate 24 and is adhered thereto in a single body; the left and the right compression fragment 22 formed between said compression flange 21 and said compressing protuberance 31 on the plate 24, in order to closely insert into the inside surface of the bumper cover 12 through the incision opening part 13. Therefore, the nozzle joint 10 and the nozzle case 11 are fixed on the bumper cover 12 without movement and rotation during assembly.

In particular, the screw passing space 23 on both sides of the body supporting plate 24 is formed as a slot. As the result, when the screw 16 is screwed with the screw assembling rod 27 formed on nozzle case 11, advancement of the screw can be controlled.

The outside surface of the compressing fragment 22 has rounded surface 30. Therefore, during combination with the bumper cover 12, the compressing fragment 22 and the rounded surface 30 are preferably shape-fitted and compressed with the incision opening part 13 of the bumper cover 12. As a result, the nozzle joint 10 and the nozzle case 11 do not move on the bumper cover 12.

Figure 3:
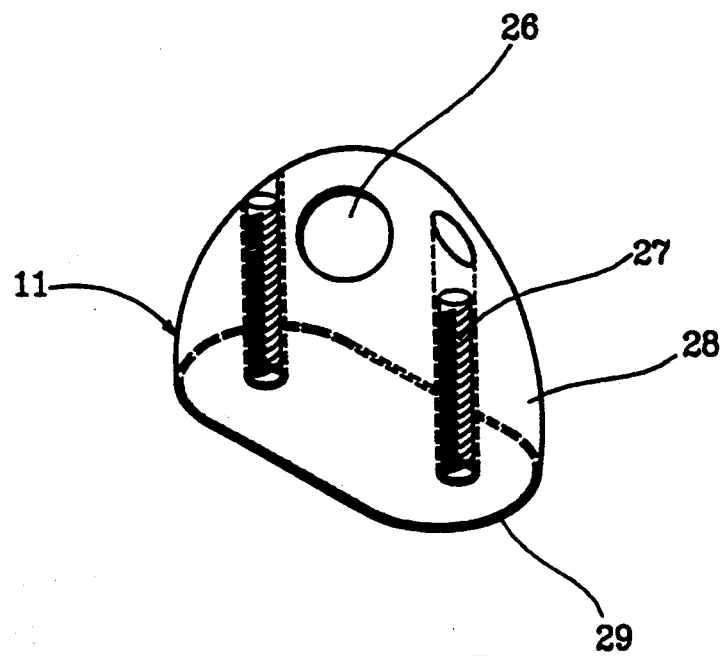
FIG. 3 shows a perspective view of the nozzle case according to the present invention.
Figure 4:
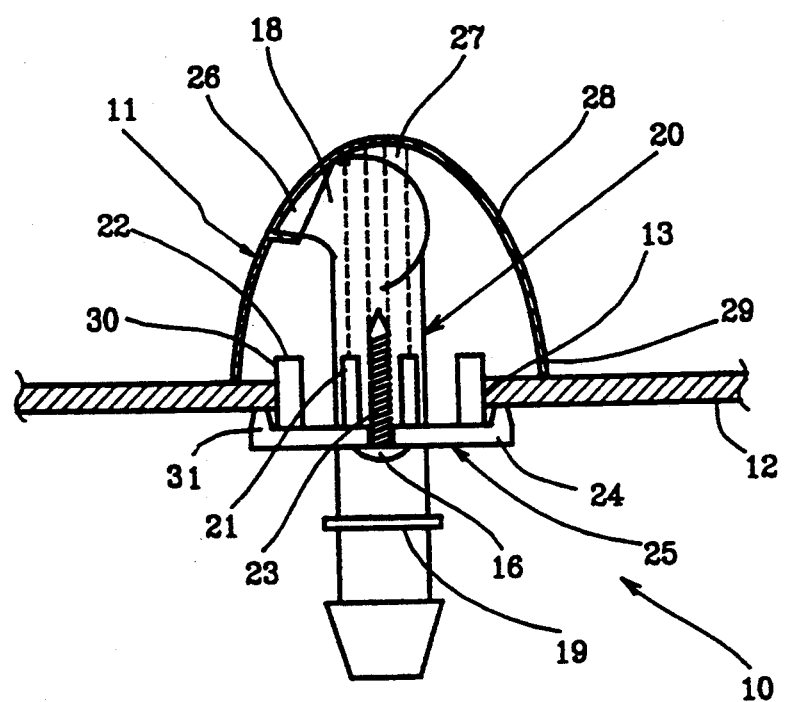
FIG. 4 shows a cross sectional view of the assembly of a nozzle joint with a nozzle case according to the present invention.

The nozzle case 11 of the present invention is shown in FIG. 3 as a perspective view. As shown in FIGS. 3 and 4, the nozzle case 11 is formed as an empty hemisphere having opening hole 26 on the upper side of the nozzle case 11 for assembly with the head 18 of nozzle joint 10. When the nozzle joint 10 and nozzle case 11 are assembled, the screw assembling rod 27 rests in a vertical direction centered laterally inside the nozzle case 11 such that the head 18 of the nozzle joint 10 meets with the opening hole of the nozzle case 11 as shown in FIG. 4. The screw assembling rod 27 is internally threaded such that the nozzle joint 10 and the nozzle case 11 are interconnected by the screw 16 without any nut.

FIG. 4 shows an assembled structure of said nozzle joint 10 and nozzle case 11 with the bumper cover 12. As shown in FIG. 4, when the nozzle joint 10 is combined with the incision opening part 13 formed on the bumper cover 12, the compressing protuberance 31 formed on the body supporting plate 24 of the combining means 25 is closely adhered to the lower surface of the bumper cover 12, and simultaneously the rounding surfaces 30 of the left and the right compressing fragment 22 are forcibly set in the incision opening part 13 of the bumper cover 12. The portion of the nozzle tube 20 above bumper cover 12 is put on the nozzle case 11 in order that the head 18 is covered. During assembly, the head 18 is inserted into the opening hole 26 of the nozzle case 11, and simultaneously the nozzle case 11 is secured with nozzle joint 10, by inserting the screw 16 through the screw passing space 23 formed in the body supporting plate 15 of the combining means 25 and threading the screw 16 into the screw assembling rod 27 of nozzle case 11.

According to the present invention, in order to exactly properly center the tip of screw 16 with the center of the screw assembling rod 27 for screwing, the screw 16 can be moved in conformity with the slot of the screw passing space 23 on the body supporting plate 24. Therefore, even when the head 18 of nozzle joint 10 is inappropriately inserted with the opening hole 26 of nozzle case 11, the screw 16 can easily be assembled as long as the head 18 and the opening 26 are not too greatly mismatched.

After securing the nozzle joint 10 and the nozzle case 11 by means of the screw 16, further tightening of the screw 16 increases the pressure between the lower section 29 of nozzle case 11 and the upper surface of bumper cover 12, and increases the pressure between the compressing protuberance 31 of nozzle joint 10 and the lower surface of bumper cover 12. Therefore, this clamping force, due to the above mechanism, more securely maintains the assembly of the nozzle joint 10 and the nozzle case 11 with the bumper cover 12.

According to the present invention as described above, since nozzle joint 10 and nozzle case 11 can be securely assembled with the bumper cover by directly assembling them, the number of parts is decreased and then the cost is lowered. And because the nozzle joint 10 and the nozzle case 11 are strongly assembled and screwed forming a compressing force, the gas tight effect and the assembling property are improved.

I claim:

1. A headlamp washing nozzle assembly for mounting a nozzle joint to a nozzle case through a hole in a bumper cover comprising:

said nozzle joint having a nozzle tube defining a longitudinal axis of said nozzle joint and a combining means, said combining means further comprising a compression flange and a compressing fragment which cooperate to orient said nozzle joint in said hole, a compressing protuberance for compressing said bumper cover between said nozzle joint and said nozzle case, and a body supporting plate extending generally transverse to said axis for connecting said compression flange, compressing fragment, and compressing protuberance to said nozzle tube, said body supporting plate further defining a screw passing space; and said nozzle case having a generally hemispherically shaped cover defining an inner side therewithin and including a hole therethrough for passage of a portion of said nozzle tube, said nozzle case further including a screw assembling rod extending from said inner side for receiving a screw passing through said screw passing space and said bumper cover.

2. The headlamp washing nozzle assembly of claim 1 wherein said screw passing space is a slot.

3. The headlamp washing nozzle assembly of claim 1 wherein said nozzle tube comprises a body and head with an opening hole for the passage of fluid.

4. The headlamp washing nozzle assembly of claim 3 wherein said head is curved.

* * * * *